US012592984B2

(12) United States Patent
Dattatraya et al.

(10) Patent No.: US 12,592,984 B2
(45) Date of Patent: Mar. 31, 2026

(54) MULTIMODAL VEHICLE SENSOR FUSION AND STREAMING

(71) Applicant: GM Cruise Holdings LLC, San Francisco, CA (US)

(72) Inventors: Vinayaka Dattatraya, Mill Creek, WA (US); Christopher Gorham, Kansas City, MO (US); Curtis Boushley, Issaquah, WA (US); Yu Chen, Fremont, CA (US); Steven Sturkop, Provence-Alpes-Côte (FR)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/403,527

(22) Filed: Jan. 3, 2024

(65) Prior Publication Data

US 2025/0220080 A1      Jul. 3, 2025

(51) Int. Cl.
    *H04L 67/12*        (2022.01)
    *G08G 1/00*        (2006.01)
    *H04L 47/25*        (2022.01)

(52) U.S. Cl.
    CPC .............. *H04L 67/12* (2013.01); *H04L 47/25* (2013.01); *G08G 1/20* (2013.01)

(58) Field of Classification Search
    CPC ..... H04L 67/12; H04L 47/25; H04L 2212/00; H04L 2209/84; G08G 1/20
    See application file for complete search history.

(56) References Cited

U.S. PATENT DOCUMENTS

| | | | | |
|---|---|---|---|---|
| 2002/0131496 A1* | 9/2002 | Vasudevan | ............. | H04N 19/40 |
| | | | | 375/240.11 |
| 2002/0141384 A1* | 10/2002 | Liu | ..................... | H04L 65/1106 |
| | | | | 370/352 |
| 2014/0195630 A1* | 7/2014 | Malik | ................. | H04L 49/9063 |
| | | | | 709/212 |
| 2016/0156541 A1* | 6/2016 | Nistor | ..................... | H04L 43/50 |
| | | | | 709/223 |
| 2016/0164761 A1* | 6/2016 | Sathyanarayana | ...... | H04L 65/80 |
| | | | | 709/219 |
| 2017/0345228 A1* | 11/2017 | Dibb | ........................ | H04W 4/44 |
| 2018/0103355 A1* | 4/2018 | Hergesheimer | ..... | H04M 1/0202 |

(Continued)

*Primary Examiner* — Tonia L Dollinger
*Assistant Examiner* — Linh T. Nguyen
(74) *Attorney, Agent, or Firm* — Honigman LLP; Matthew H. Szalach; Jonathan P. O'Brien

(57)        ABSTRACT

Systems and methods for encrypting and streaming AV sensor data and AV derived data. In particular, systems and methods are provided for receiving AV sensor data at a streaming platform and providing the received data to multiple endpoints. In some examples, the multiple endpoints are multiple viewers viewing the AV sensor data. In various examples, an AV transmits the AV sensor data to the streaming platform, and the AV sensor data can be transmitted from the streaming platform to multiple endpoints without any effect on AV central processing unit or bandwidth constraints. The AV sensor data can include multiple data streams that are layered and compressed for efficient streaming, and the streaming platform can receive real-time streamed data from the AV even as bandwidth and connection constraints vary. In various examples, the bit rate of the video ingestion from the AV can be changed based on bandwidth availability.

20 Claims, 7 Drawing Sheets

400

(56)  References Cited

U.S. PATENT DOCUMENTS

| | | | |
|---|---|---|---|
| 2018/0120848 A1* | 5/2018 | Kulferst | G07C 5/00 |
| 2018/0293906 A1* | 10/2018 | Chen | H04N 21/47217 |
| 2019/0097793 A1* | 3/2019 | Nix | H04L 63/0807 |
| 2020/0336541 A1* | 10/2020 | Naderi Alizadeh | H04W 4/38 |
| 2021/0366278 A1* | 11/2021 | Park | G08G 1/096791 |
| 2022/0335153 A1* | 10/2022 | Herman | G06N 3/094 |
| 2023/0269566 A1* | 8/2023 | Spagnolini | G01S 13/931 |
| | | | 455/39 |
| 2024/0098143 A1* | 3/2024 | Mesde | H04L 41/0806 |
| 2024/0098319 A1* | 3/2024 | Luo | H04N 21/6143 |
| 2024/0348842 A1* | 10/2024 | Davoodi | H04N 21/26613 |

* cited by examiner

100

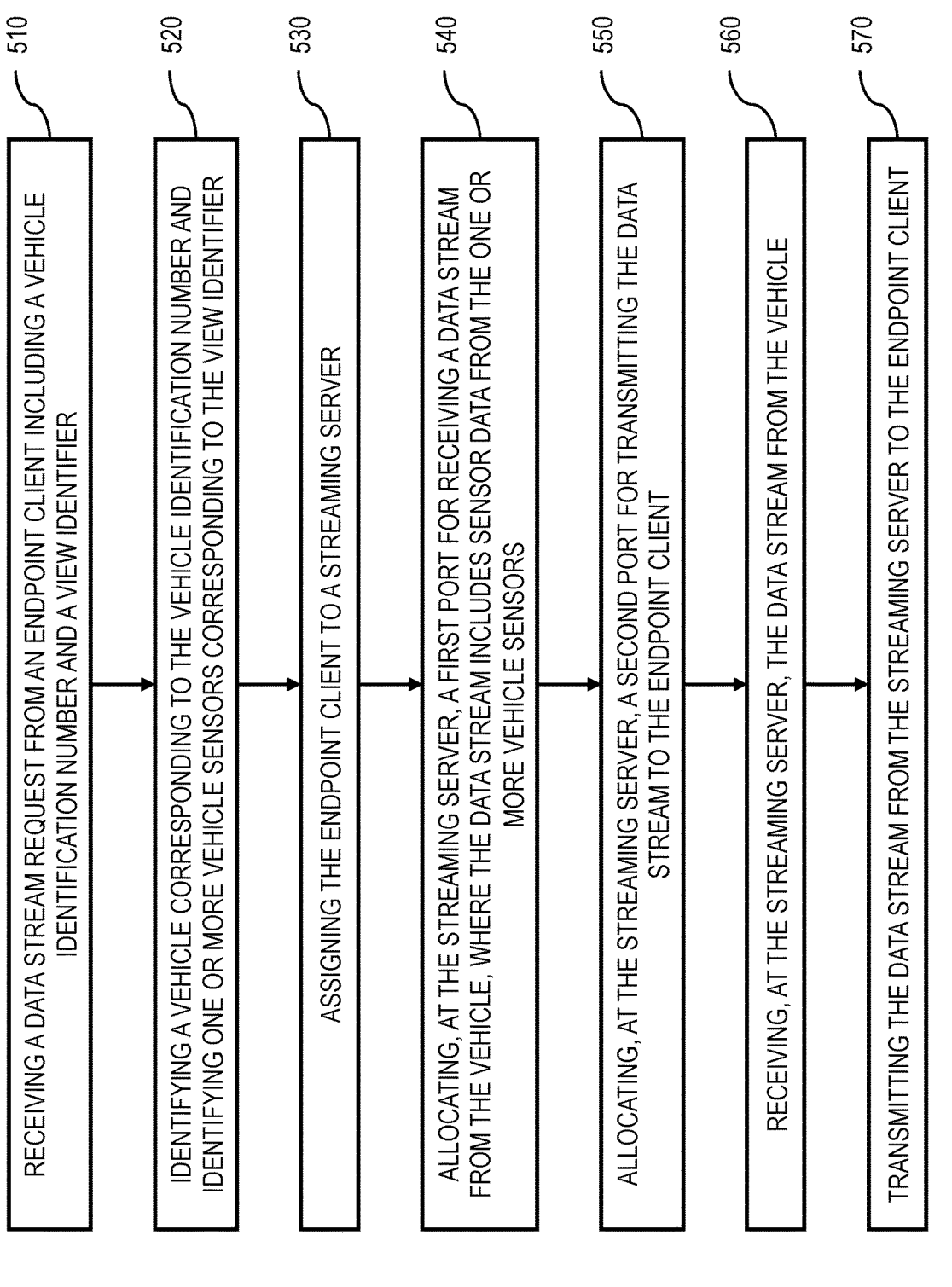

500

510 — RECEIVING A DATA STREAM REQUEST FROM AN ENDPOINT CLIENT INCLUDING A VEHICLE IDENTIFICATION NUMBER AND A VIEW IDENTIFIER

520 — IDENTIFYING A VEHICLE CORRESPONDING TO THE VEHICLE IDENTIFICATION NUMBER AND IDENTIFYING ONE OR MORE VEHICLE SENSORS CORRESPONDING TO THE VIEW IDENTIFIER

530 — ASSIGNING THE ENDPOINT CLIENT TO A STREAMING SERVER

540 — ALLOCATING, AT THE STREAMING SERVER, A FIRST PORT FOR RECEIVING A DATA STREAM FROM THE VEHICLE, WHERE THE DATA STREAM INCLUDES SENSOR DATA FROM THE ONE OR MORE VEHICLE SENSORS

550 — ALLOCATING, AT THE STREAMING SERVER, A SECOND PORT FOR TRANSMITTING THE DATA STREAM TO THE ENDPOINT CLIENT

560 — RECEIVING, AT THE STREAMING SERVER, THE DATA STREAM FROM THE VEHICLE

570 — TRANSMITTING THE DATA STREAM FROM THE STREAMING SERVER TO THE ENDPOINT CLIENT

FIG. 5

MULTIMODAL VEHICLE SENSOR FUSION AND STREAMING

BACKGROUND

1. Technical Field

The present disclosure generally relates to streaming sensor data, and, more specifically, to multimodal vehicle sensor fusion and streaming.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, ultrasonic sensors, inertial sensor module (ISM), acoustic sensors, amongst others. The sensors perceive the environment around the vehicles and collect massive data and measurements that the autonomous vehicle can use for operations such as control and navigation. The sensors can provide the data and measurements to an internal computing system of the autonomous vehicle, which can use the data and measurements to predict, plan and control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 is a flow chart illustrating a method for connecting a vehicle to a streaming platform, according to various examples of the present disclosure;

DETAILED DESCRIPTION

Figure 1:
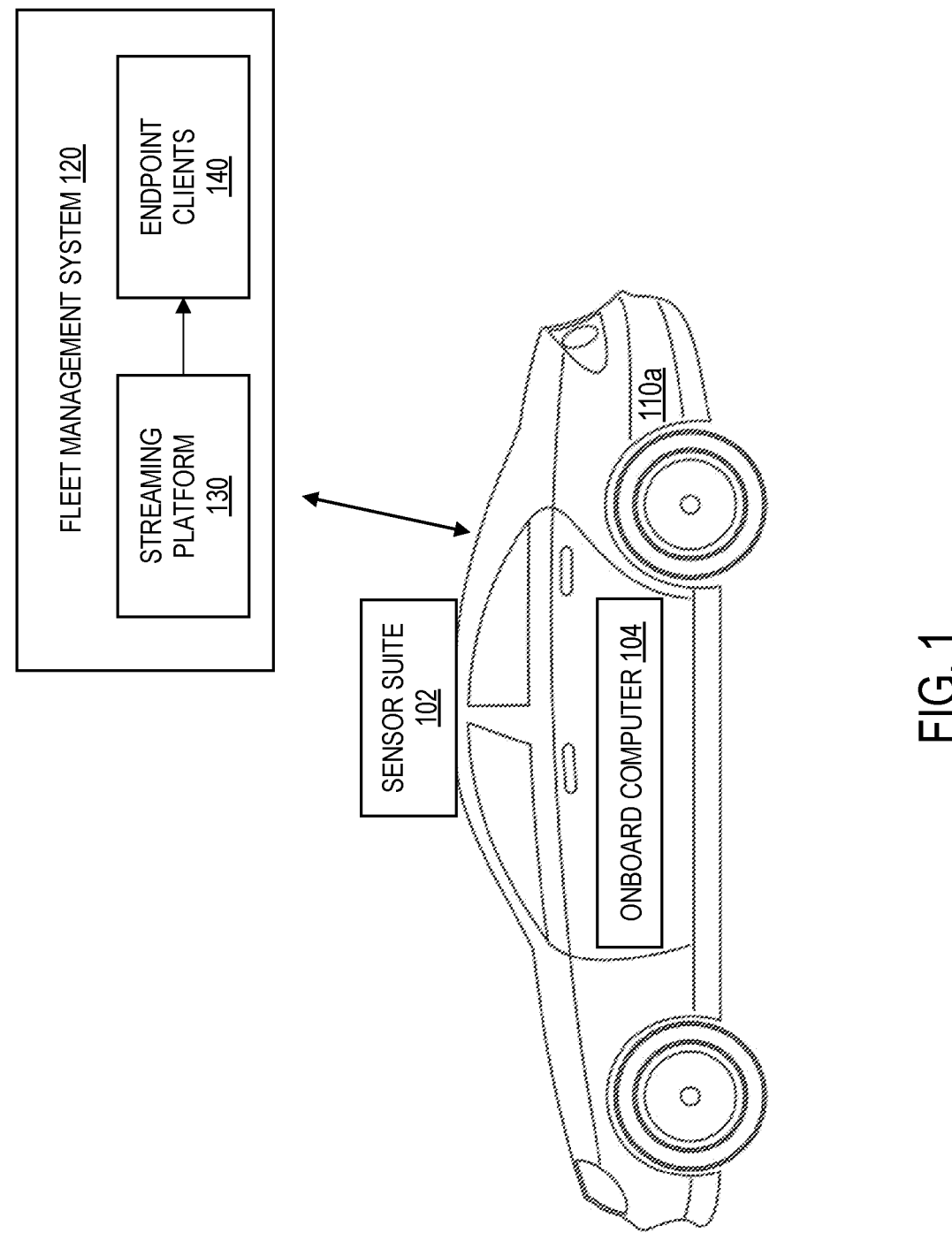
FIG. 1 illustrates an autonomous vehicle connecting to a streaming platform, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for encrypting and streaming AV sensor data and AV derived data. In particular, systems and methods are provided for receiving AV sensor data at a cloud-based streaming platform and providing the received data to multiple endpoints. In some examples, the multiple endpoints are multiple viewers viewing the AV sensor data. In various examples, an AV transmits the AV sensor data to the streaming platform, and the AV sensor data can be transmitted from the streaming platform to multiple endpoints without any effect on AV CPU (central processing unit) or bandwidth constraints. The AV sensor data can include multiple data streams that are layered and compressed for efficient streaming.

In some examples, when an AV connects with a live viewer, the AV sensor data is streamed to the live viewer using peer-to-peer (P2P) streaming. An additional live viewer would result in the AV having a second transmission of the AV sensor data, affecting AV CPU and bandwidth constraints. In general, due to inherent bandwidth constraints of AVs and the nature of P2P streaming, it isn't possible to add support for multiple viewers. Systems and methods are provided herein for a cloud-based real-time streaming platform for receiving a stream of AV sensor data from the AV and providing the AV sensor data to multiple endpoints via multiple respective streams from the platform to the endpoints. Additionally, authorization systems for access to an AV data stream can be moved to the cloud-based streaming platform.

The cloud-based real-time streaming platform can receive real-time streamed data from an AV even as bandwidth and connection constraints vary. In various examples, the bit rate of the video ingestion from the AV can be changed based on bandwidth availability, such as when the AV travels through narrow bandwidth areas. Examples of the bit rate can include 100 kbps-300 kbps. Additionally, the data stream from the AV to the cloud can include streaming timeouts of 300 ms with heartbeats of data transmission between the AV and the streaming service such that the AV does not stream data with service connectivity is lost. In some examples, streaming begins and AV video data from each AV camera is transmitted from the AV to when the video data is requested from an endpoint, such as a live viewer, and streaming ends and AV video data transmission stops when the last endpoint disconnects.

Example Vehicle Connecting to a Streaming Platform

FIG. 1 illustrates an autonomous vehicle 110 connecting to a streaming platform 130, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data.

The vehicle 110 includes multiple sensors that generate sensor data, and can connect to a streaming platform 130 to provide the sensor data to various endpoint clients 140. In various examples, the vehicle 110 also includes a cellular modem for connecting to the streaming platform 130. In various implementations, the vehicle 110 can connect with a fleet management system 120, which can provide information to the vehicle 110 such as ride requests, vehicle destination instructions, vehicle updates, map updates, etc. The fleet management system 120 can include the streaming platform 130 and the endpoint clients 140. The endpoint clients can be human assistants or other clients of the vehicle sensor data. In some examples, the endpoint clients 140 are separate from the fleet management system 120.

The vehicle 110 includes a sensor suite 102 for generating sensor data. The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as locations of roadside shelters. Additionally, sensor suite 102 data can provide localized traffic information, ongoing road work information, and current road condition information. Furthermore, sensor suite 102 data can provide current environmental information, including current roadside environment information, such as the presence of people, crowds, and/or objects on a roadside or sidewalk. In this way, sensor suite 102 data from many autonomous vehicles can continually provide feedback to the mapping system and a high fidelity map can be updated as more and more information is gathered. In some examples, the sensor suite 102 can identify emergency personnel at or around the vehicle 110. In various examples, the vehicle 110 also includes sensors inside the vehicle, and sensor data includes data from the sensor suite 102 sensors and interior vehicle sensors.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARS with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensor data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

Figure 2:
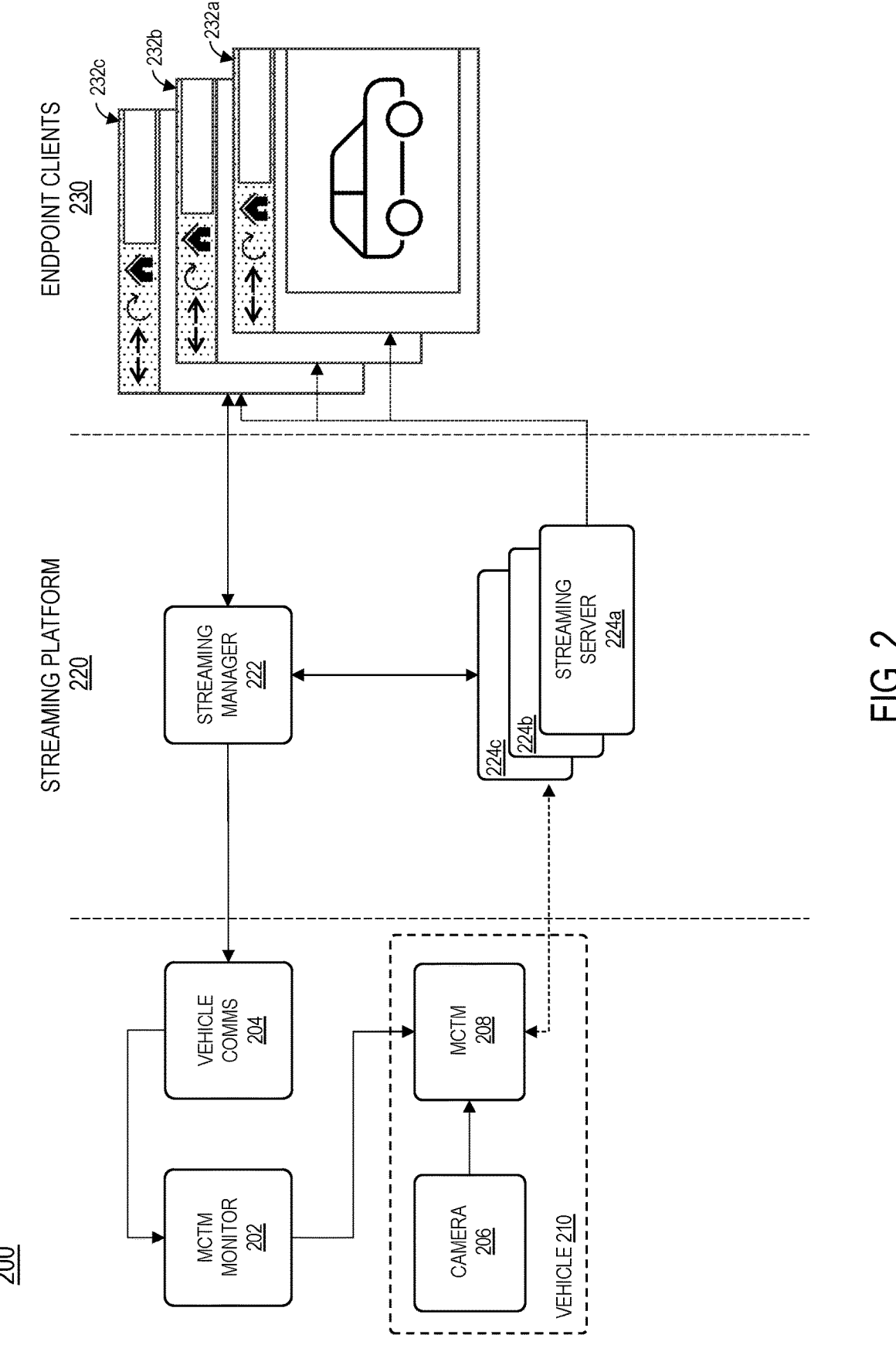
FIG. 2 is a block diagram of an illustrative AV streaming system including a vehicle, a streaming platform, and end-point clients, according to various examples of the present disclosure.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.
Example Streaming Platform FIG. 2 is a block diagram of an illustrative AV streaming system 200 including a vehicle 210, a streaming platform 220, and endpoint clients 230, according to various examples of the present disclosure. The vehicle 210 includes a camera 206, a multi-carrier telematics module (MCTM) 208. A cloud-based service includes the MCTM monitor 202 and a vehicle communications module 204. The streaming platform 220 includes a streaming manager 222 and multiple streaming servers 224a-224c. The endpoint clients 230 include one or more interfaces 232a-232c for viewing streamed camera 206 data. In some examples, the interfaces 232a-232c are browsers.

Figure 6:
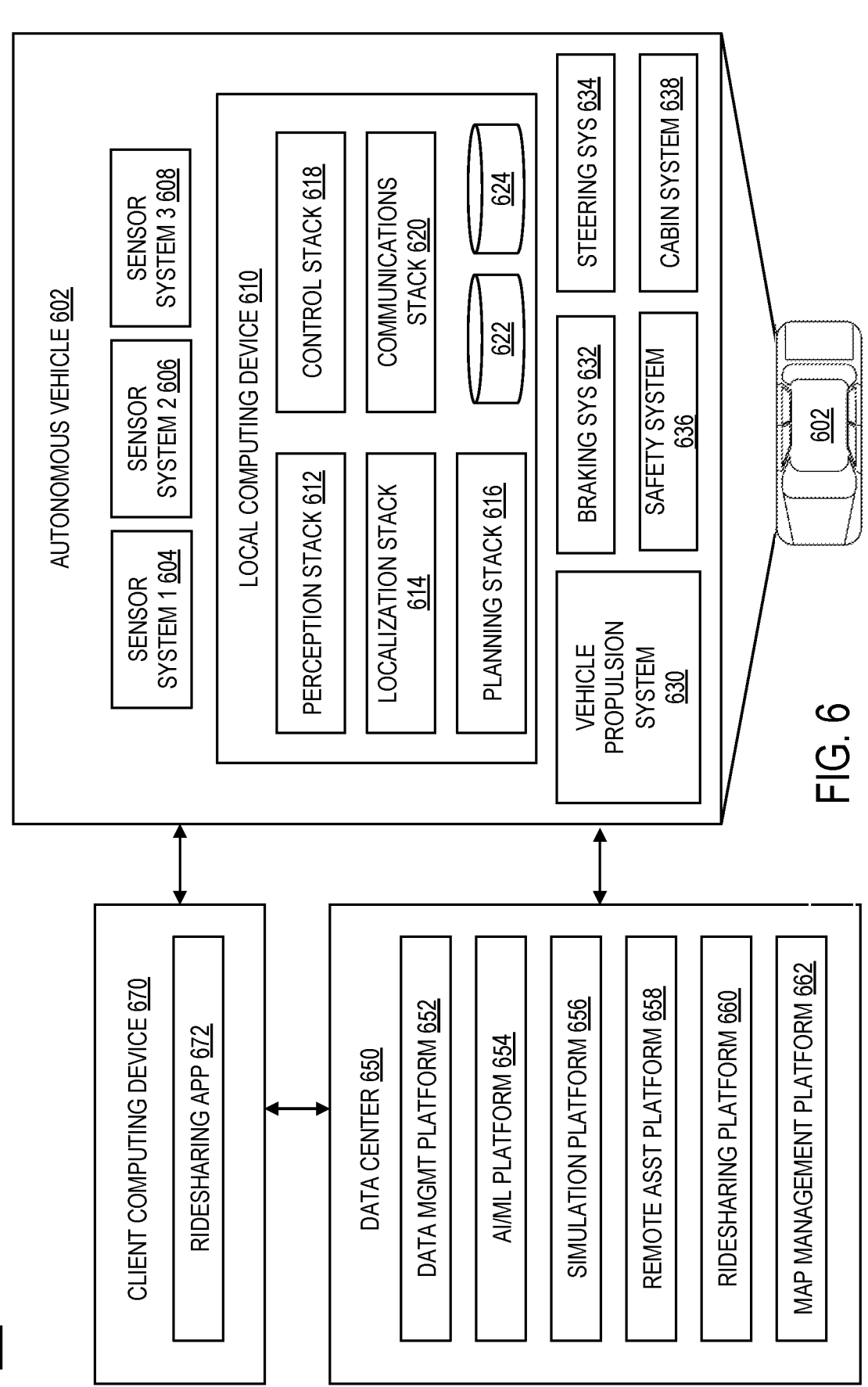
FIG. 6 illustrates an example system environment that can be used to facilitate autonomous vehicle (AV) dispatch and operations, according to some aspects of the disclosed technology.

The vehicle 210 can be an autonomous vehicle such as the vehicle 110 of FIG. 1, and can include various vehicle components as discussed with respect to the AV 602 of FIG. 6. The MCTM 208 can include multiple connection modules to multiple respective radio and/or cellular communication service providers, which can use the same or different networks (e.g., LTE, 5G, 4G, GSM, and CDMA). The MCTM 208 can receive camera data from one or more vehicle cameras, and transmit the camera data to one or more streaming servers 224a-224c in the streaming platform 220. In some examples, the MCTM 208 receives a certificate from the streaming server 224a-224c verifying the streaming server's authority to request and receive the camera data from the vehicle 210. The certificate can include, for example, encryption information extracted from a communication protocol session, such as a datagram transport layer security (DTLS) session. In one example, the encryption information is an asymmetric encryption key that can be used to validate identity, and other protocols can be used to exchange further encryption information. The MCTM 208 provides the camera data to a streaming server 224a-224c. In some examples, the MCTM 208 provides the data via a securing real-time protocol (SRTP) media stream.

The streaming platform 220 includes the streaming manager 222 and multiple streaming servers 224a-224c. Each data stream from the vehicle 210 is associated with a single streaming platform instance. In various examples, the streaming manager 222 manages load balancing during stream initialization. In some examples, if streamer instances are made routable from endpoint clients and the vehicle 210, Network Access Translation (NAT) tunneling can be avoided. NAT refers to a router repackaging traffic as it passes through the router such that the traffic comes from a single IP address, allowing a single router with a single IP address to interact with external networks on behalf of multiple devices that are routing traffic to the router. NAT can allow an organization to control its network assignments while interacting with other networks. NAT tunneling is a set of methods that allows devices on opposite sides of a NAT tunnel to communicate directly with each other. The vehicle 210 can authenticate the streaming server 224a-224c based on providing a certificate that is part of a trusted certificate chain.

In various examples, the streaming manager 222 provides an interface for endpoint clients 230 to request streamed data from an AV, such as the vehicle 210. A streaming request can include a vehicle identification number (VIN) or other vehicle identifier, and a desired view from the vehicle. For instance, a streaming request can include a request for a view in front of the vehicle, a view behind the vehicle, or a view to the left or right of the vehicle. Additionally, a streaming request can include a request for a view from one or more interior cameras and/or a request for a view from one or more exterior cameras. In various examples, the streaming request can include a request for a view from any selected direction 360 degrees around the vehicle. The streaming manager 222 performs the authorization to ensure that the endpoint client is allowed to stream the specified data, based on the vehicle identification and the requested camera group (i.e., viewing direction and/or angle). In various examples, the streaming manager 222 periodically audits outgoing streams to verify continued authorization. The streaming manager 222 can record which streams are being processed on which of multiple streaming servers 224a-224c.

In various implementations, the streaming manager 222 maintains a database including information for routing streams, such as a list of the current streaming server 224a-224c instances, the condition of each of the current streaming server 224a-224c instances, and a list of currently active streams. In particular, the streaming manager 222 determines which instances of the streaming servers 224a-224c are alive and functional. Each streaming server 224a-224c has an ongoing registration and heartbeat process to communicate its presence and condition to the streaming manager 222. In some examples, at regular intervals, each streaming server 224a-224c sends a registration request to the streaming manager 222. The duration of the regular intervals can be configurable, for example by an operator. The registration request includes the streaming server 224a-224c IP address, its current state (e.g., healthy, draining, etc.), and a list of streams the respective streaming server 224a-224c is currently handling. When the streaming manager 222 receives the registration request, the streaming manager 222 updates the last-seen time of the respective streaming server 224a-224c in the database entry for the respective streaming server 224a-224c. In some implementations, the streaming servers 224a-224c directly update the database with the respective streaming server 224a-224c information.

In some implementations, when a vehicle 210 is not currently streaming data to a streaming server 224a-224c, the streaming manager 222 can initiate streaming by sending a request to the vehicle communications module 204 to begin streaming. The request can include the details of the streaming server 224a-224c to stream to, including, for instance, the streaming server 224a-224c address, host, port, camera group, user information, certificate information, and other identifying information. The vehicle communications module 204 can evaluate the request and transmit a verified and/or authorized request to the MCTM monitor 202 for transmission to the MCTM 208. An exemplary process for initiating a streaming server 224a-224c is described in greater detail with respect to FIG. 3. An exemplary process for adding a new endpoint client to existing streaming server 224a-224c is described in greater detail with respect to FIG. 4.

The streaming servers 224a-224c can be located in a subnet, and each streaming server 224a-224c can be hosted on a dedicated host and have a routable IP address from the vehicle 210, allowing for extremely low latency streaming (less than 200 ms latency). In some examples, the routable IP address eliminates NAT transversal complexities. In some examples, video ingestion at a streaming server 224a-224c from the vehicle 210 includes only SRTP and DTLS, and WebRTC core components are not transmitted from the vehicle 210 to the streaming server 224a-224c, allowing for minimal CPU usage and minimal memory use by the vehicle and by the MCTM 208 for data transmission to the streaming server 224a-224c. In some examples, video ingestion at a streaming server 224a-224c from the vehicle 210 includes SRTP and DTLS, and some WebRTC components. In some examples, a vehicle 210 uses full WebRTC for streaming. Each respective streaming server 224a-224c can broadcast media to browser clients. In some examples, the streaming servers 224a-224c broadcast media to browser clients as web real-time communication (WebRTC) streams. In some examples the streaming servers 224a-224c receive media from a vehicle 210 (or MCTM 208) using a different ingestion protocol, such as WebRTC. As discussed above, a DTLS session establishment and/or key exchange can be used to allow the vehicle 210 to authenticate the legitimacy of the streaming server 224a-224c. SRTP streams can be encrypted using keys extracted from the DTLS session. In some examples, the streaming servers 224a-224c support real-time transport control protocol (RTCP) to record performance details and provide picture loss indication (PLI) messages to the vehicle 210 when new clients connect.

In various examples, the streaming platform 220 maintains a mapping of which connections are to receive data from which vehicles. In some examples, the streaming servers 224a-224c maintain the mapping of which connections are to receive data from which vehicles. The streaming servers 224a-224c can allocate ports to each inbound and outbound stream to avoid demultiplexing multiple streams on a single port. In some examples, the streaming manager 222 instructs streaming servers 224a-224c to allocate ports for respective streams. In some examples, streaming servers 224a-224c can authenticate viewing clients based on certificate thumbprints from an SDP exchange. In some examples, the streaming servers 224a-224c can receive certificates, passwords, and/or other authentication keys from a cloud-based vehicle secrets-storage vault or other autonomous vehicle service.

In various examples, a streaming server 224a-224c instance shutdown procedure can be triggered when the respective streaming server 224a-224c handling a stream has no clients for the stream. Similarly, in some examples, a streaming server 224a-224c instance shutdown procedure can be triggered when the respective streaming server 224a-224c handling a stream stops receiving the stream from the vehicle 210. In some examples, a streaming server 224a-224c sends a "stream ended" message to the streaming manager 222 including a stream identification number. When the shutdown procedure is initiated because there are no clients for the stream, the streaming manager 222 can send a notification to the vehicle 210 to stop streaming. Additionally, the streaming manager 222 can remove the entry for the stream from its database. In some examples, an endpoint client is a browser client, and the browser client can disconnect from a stream by sending a message to a client backend, which the client backend then transmits to the streaming manager 222. The streaming manager 222 forwards the message to the respective streaming server 224a-224c. The respective streaming server 224a-224c can stop streaming to the respective browser client and, if the browser client is the last and/or only client, the streaming server 224a-224c can trigger the shutdown procedure.

In various examples, endpoint clients can be remote assistant services, and/or a central server service, including back end services and front end services. Back end services handle communication with the streaming manager 222, while front end services are the services a live operator interfaces with. In some examples, the front end service can be a browser client. In various examples, the endpoint client can view a stream via a streaming interface, such as a browser.

Figure 3:
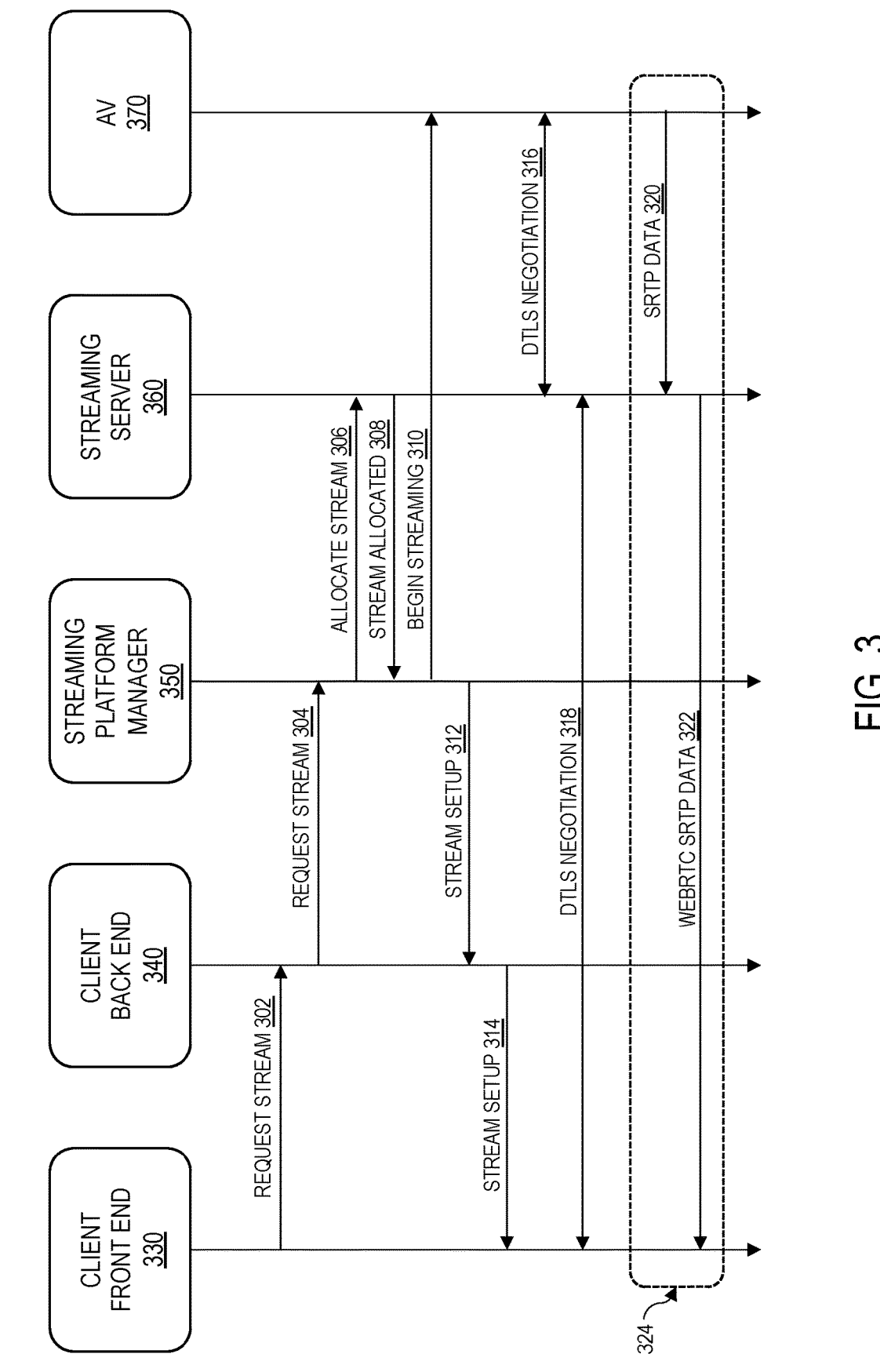
FIG. 3 is a diagram illustrating an exemplary process for initiating a streaming server, according to various examples of the present disclosure.

FIG. 3 is a diagram illustrating an exemplary process 300 for initiating a streaming server, according to various examples of the present disclosure. The diagram includes endpoint clients including a client front end 330 and a client back end 340. The endpoint client can be a human assisted live operations client. The client front end 330 can include an interface such as a browser instance and/or web client. The interface can be a real-time video streaming interface through which a human viewer can view a livestream video from a vehicle. The client back end 340 can include client software, security, and other client streaming services. A client front end 330 can send a stream request 302 to the client back end for a sensor data stream (e.g., a camera stream) from a specific vehicle. The request can include a streaming target, such as a vehicle identification number, and a view identification indicating a specific vehicle camera and/or a specific vehicle angle or direction to stream. In some examples, the camera, angle, and/or direction request can be updated after streaming begins, resulting in a new stream from a different vehicle camera. In some examples, a human initiates a request through the client front end 330 interface. The stream request 304 can also include a user email address, and a Session Description Protocol (SDP) offer. In some examples, instead of including the SDP offer in the stream request, the SDP offer is generated on the streaming server 360 and returned as part of the response to a stream request. The client back end 340 processes the request and submits a stream request 304 to a streaming manager 350. The stream request 304 can also include the vehicle identification number and the view identification. In some examples, the stream request 304 is transmitted to the streaming manager 350 over a general-purpose Remote Procedure Call framework (gRPC).

The streaming manager 350 determines that no existing stream fulfills the stream request 304, chooses an active streaming server 360 to send the stream request 304 to, and generates a stream ID. In particular, the streaming manager 350 allocates a stream 306 including the stream ID and sends the allocated stream 306 over gRPC to the streaming server 360. The streaming server 360 allocates two ports, a first port for receiving the stream from the AV 370 and a second port for broadcasting the stream to the client back end 340, and sends the allocated stream details 308 to the streaming manager 350. The streaming manager 350 provides details received from the streaming server 360 to the AV 370 via vehicle communications. In some examples, the streaming manager 350 provides a begin streaming message 310 including the streamer IP and port information to the AV 370. The streaming manager 350 can provide the streamer IP and port information to the AV 370 in a protobuf message. The streaming manager 350 also sets up a stream 312 with the client back end 340, and transmits the streamer IP and port to the client back end 340. The client back end 340 sets up a stream 314 with the client front end 330, where stream 314 is based on the streamer IP and port information received from the streaming manager 350.

The AV 370 initiates DTLS negotiation 316 with the streaming server 360. In particular, the AV 370 validates that the authentication certificate provided by the streaming server 360 is an internal trusted certificate. Similarly, the streaming server 360 validates that the certificate provided by the AV 370 is a trusted certificate. In various examples, the client front end 330 initiates DTLS negotiation with the streaming server 360, and both the client front end 330 and streaming server 360 validate that the certificates provided match the certificate fingerprint in the SDP offer and SDP answer.

The AV 370 sends SRTP data 320 to the streaming server 360 using authentication information (e.g., encryption keys) established during the DTLS negotiations 316, 318. The streaming server 360 decrypts the SRTP data 320, re-encrypts the SRTP data 320 with the appropriate encryption key(s) for the specific client front end 330, and transmits the re-encrypted data to the client front end 330. In some examples, the transmission of SRTP data outlined in the dashed line 324 is repeated until the stream ends.

Figure 4:
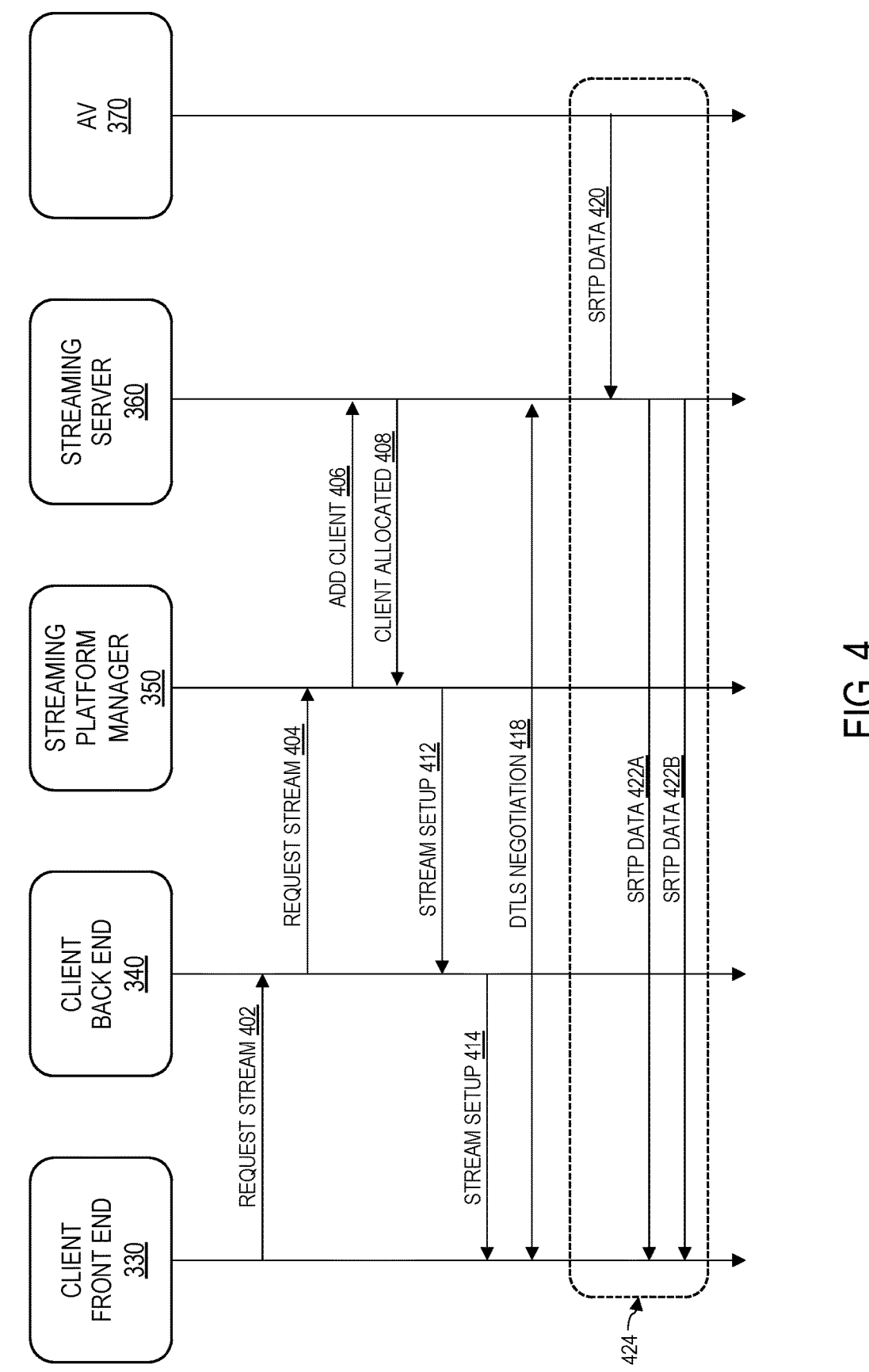
FIG. 4 is a diagram illustrating an exemplary process for adding a new client to existing streaming server, according to various examples of the present disclosure.

FIG. 4 is a diagram illustrating an exemplary process 400 for adding a new client to an existing streaming server, according to various examples of the present disclosure. In some examples, the streaming target (e.g., the vehicle) and the view identifier (e.g., a specific vehicle camera and/or a specific vehicle angle or direction to stream) are identified by the client front end 332, where the client front end 332 includes the original client front end client and a new client front end. The new client front end can also identify the SDP Offer. This information is sent in a stream request 402 to the client back end 340. After authorizing the request, the streaming target, the view identifier and the SDP offer are sent to the streaming manager 350 in a stream request 404. In some examples, the stream request 404 is transmitted over gRPC.

The streaming manager 350 determines that an existing stream can fulfill the request and sends a request to add a client 406 to the streaming server 360 that is handling the stream with the stream ID of the existing stream that can fulfill the request. The streaming server 360 allocates a port for broadcasting the stream to the new client. The details for the new client are encoded and the client allocated 408 answer is returned to the streaming manager 350. In some examples, the answer is an SDP answer. The streaming manager 350 returns stream setup information 412, including the stream ID and the SDP answer, to the client back end 340. The client back end 340 provides the SDP answer to the new client front end. The new client front end initiates DTLS negotiation 418 with the streaming server 360. Both the client front end and the streaming server 360 validate certificate authenticity of the certificates provided by the other party. In particular, both the client front end and the streaming server 360 validate that the certificates provided by the other party match the certificate fingerprint in the SDP offer and/or SDP answer.

The AV 370 sends SRTP data 420 to the streaming server 360 using the key material (e.g., encryption and/or decryption keys) established during the DTLS negotiation 418. The streaming server 360 decrypts the SRTP data 420, re-encrypts the SRTP data 422*a* with the appropriate key material (e.g., encryption and/or decryption keys) for the first client front end, and forwards the re-encrypted SRTP data to the first client front end. The streaming server 360 re-encrypts the SRTP data 422*b* with the appropriate key material (e.g., encryption and/or decryption keys) for the new second client front end, and forwards the re-encrypted SRTP data 422*b* to the new second client front end. In various examples, the client front end 332 includes both the first client front end and the second client front end. As shown in FIG. 2, the client front end can include multiple client front ends, such as multiple client browsers or other interfaces.

Method for a Real-Time Streaming Platform

FIG. 5 is a flow chart of a method 500 for connecting a vehicle with multiple endpoint clients, according to some examples of the present disclosure. In particular, a data stream from a vehicle can be transmitted to a cloud-based streaming platform, and the data stream can be provided from the streaming platform to multiple endpoint clients. At step 510, a data stream request is received from an endpoint client. In some examples, the endpoint client can be a web interface or browser, where the user can be a remote assistant or other human, and the web interface or browser provides a window for presentation of data stream information. The data stream includes a data stream including sensor data from a specific vehicle, and the data stream request can include a vehicle identifier (e.g., a vehicle identification number, license plate number, etc), and a view identifier. The view identifier can indicate which sensors from the vehicle the endpoint client would like the sensor data from, and it can indicate a viewing angle or direction from the vehicle from which sensor data is requested. The data stream request at step 510 is received at a streaming platform manager (i.e., a streaming manager).

At step 520, a vehicle corresponding to the vehicle identifier is identified. In some examples, a streaming manager identifies the vehicle. Additionally, one or more vehicle sensors corresponding to the view identifier are identified. In various examples, the streaming manager uses a vehicle communication platform to connect with a vehicle via the vehicle's MCTM module. The streaming manager can provide to the vehicle information about a streaming server to which the vehicle is to transmit the sensor data from the one or more identified vehicle sensors. In particular, the streaming manager can assign a streaming server to the data stream request and/or create a new streaming server instance for the data stream request, and identifying information about the streaming server (e.g., the streamlining server IP address) can be transmitted to the vehicle from the streaming manager.

At step 530, the endpoint client is assigned to the streaming server selected by the streaming manager for receiving the data stream from the vehicle. In particular, the streaming manager can provide the streaming server with information about the endpoint client. In some examples, the streaming manager can set up a stream between the streaming server and the endpoint client.

At step 540, the streaming server allocates a first port for receiving a data stream from the vehicle, where the data stream includes sensor data from the one or more vehicle sensors identified at step 520. The streaming server can provide the first port information to the streaming manager, and the streaming manager can provide the first port information to the vehicle.

At step 550, the streaming server allocates a second port for transmitting the data stream to the endpoint client. In various examples, the second port can be used to transmit the data stream to multiple endpoint clients. In some examples, the streaming server can allocate additional ports for transmitting the data stream to respective additional endpoint clients.

At step 560, the streaming server receives the data stream from the vehicle. The data stream includes the sensor data from the one or more identified sensors. The data stream is transmitted from a vehicle MCTM to the streaming server at a vehicle bit rate. In various examples, the vehicle bit rate is variable and can be dynamically changed by the vehicle. The vehicle bit rate vary from the initial bit rate used to transmit the data stream from the vehicle. In one example, the bit rate can vary between 100 kbps and 300 kbps. In some examples, the streaming server can send a request to the vehicle to adjust the vehicle bit rate. Additionally, streaming from the vehicle can be paused for short periods of time (e.g., a few hundred ms) when connectivity between the vehicle and the streaming server is lost. In various examples, as described above, the data stream is encrypted before it is transmitted to the streaming server.

At step 570, the data stream is transmitted from the streaming server to the endpoint client. The data stream includes the sensor data from the one or more sensors identified at step 520. In various examples, the data stream is transmitted from the streaming server to the endpoint client at a server bit rate. In general, the server bit rate is about equal to the vehicle bit rate, since the streaming server is forwarding the sensor data received at the vehicle bit rate. Transmitting the sensor data at the vehicle bit rate results in low latency streaming. In other examples, the server bit rate can be different from the vehicle bit rate. In some examples, the streaming server can transmit the data stream to multiple endpoint clients. For instance, the streaming server can transmit multiple copies of the data stream to multiple endpoint clients. In other examples, the streaming server can send a single stream that is received by multiple endpoint clients.

Example Autonomous Vehicle (AV) Management System

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processing System

Figure 7:
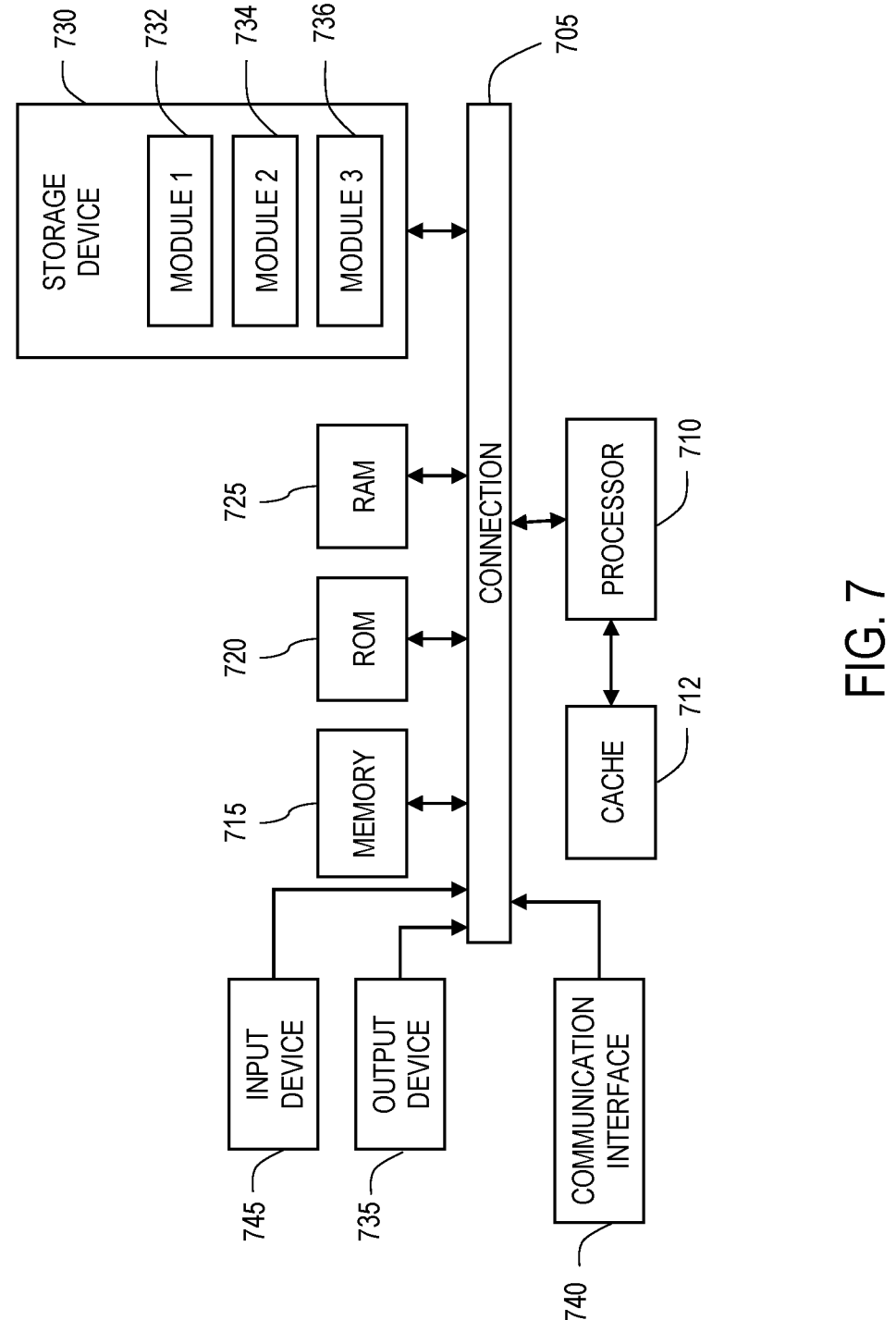
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection. In some examples, the connection 705 can be a network bus connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/ plug, a microphone jack/plug, a Universal Serial Bus (USB) port/plug, an Apple® Lightning® port/plug, an Ethernet port/plug, a fiber optic port/plug, a proprietary wired port/ plug, a BLUETOOTH® wireless signal transfer, a BLU-ETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal trans-fer, 802.11 Wi-Fi® wireless signal transfer, Wireless Local Area Network (WLAN) signal transfer, Visible Light Com-munication (VLC) signal transfer, Worldwide Interoperabil-ity for Microwave Access (WiMAX), Infrared (IR) commu-nication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal trans-fer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Program-mable ROM (PROM), Erasable PROM (EPROM), Electri-cally Erasable PROM (EEPROM), flash EPROM (FLASH EPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the func-tional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another commu-nications connection (either hardwired, wireless, or combi-nation thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system for providing data streams from a vehicle to multiple clients, including a vehicle including a plurality of sensors, where the plurality of sensors generate sensor data, and where the plurality of sensors include image sensors and the sensor data includes image data; an endpoint client including a client front end; and a streaming platform including: a streaming manager configured to: receive a data stream request from the endpoint client including a vehicle identification and a view identifier, and assign the endpoint client to a streaming server; and the streaming server configured to: allocate a first port for receiving a data stream from the vehicle, where the data stream includes the sensor data, allocate a second port for transmitting the data stream to the endpoint client, receive the data stream including the sensor data from the vehicle, and transmit the sensor data to the endpoint client.

Example 2 provides the system of example 1, where the first port has corresponding first port information, and where the streaming server is further configured to transmit the first port information to the streaming manager, and where the streaming manager is further configured to provide the first port information and a streaming server IP address to the vehicle.

Example 3 provides the system of example 2, where the streaming server is further configured to provide a streaming server authentication certificate to the vehicle, where the vehicle is configured to: validate the streaming server authentication certificate, encrypt the data stream including the sensor data, and transmit an encrypted data stream to the streaming server.

Example 4 provides the system of example 3, where the vehicle is further configured to transmit the encrypted data stream at a first bit rate, where the first bit rate is variable, and where the first bit rate is based on vehicle network bandwidth.

Example 5 provides the system of example 4, where the streaming server is further configured to transmit a request to the vehicle to adjust the first bit rate.

Example 6 provides the system of example 1, where the second port has corresponding second port information, and where the streaming server is further configured to transmit the second port information to the streaming manager, and where the streaming manager is further configured to provide the second port information and a streaming server IP address to the endpoint client.

Example 7 provides the system of example 1, where the endpoint client is a first endpoint client, where the data stream request is a first data stream request, and further including a second endpoint client, where the streaming manager is further configured to: receive a second data stream request from the second endpoint client, determine that the second data stream request can be fulfilled using the data stream, and assign the second endpoint client to the streaming server.

Example 8 provides the system of example 7, where the streaming server is further configured to allocate a third port for transmitting the data stream to the second endpoint client, and transmit the sensor data to the second endpoint client.

Example 9 provides the system of example 1, where the streaming manager further includes a streamer database including a list of current streamers including the streaming server, and a list of currently active streams.

Example 10 provides a method for providing data streams from a vehicle to multiple clients, including receiving a data stream request from an endpoint client including a vehicle identification number and a view identifier; identifying a vehicle corresponding to the vehicle identification number and identifying one or more vehicle sensors corresponding to the view identifier; assigning the endpoint client to a streaming server; allocating, at the streaming server, a first port for receiving a data stream from the vehicle, where the data stream includes sensor data from the one or more vehicle sensors; allocating, at the streaming server, a second port for transmitting the data stream to the endpoint client; receiving, at the streaming server, the data stream including the sensor data from the vehicle, where the data stream is transmitted from the vehicle at a first bit rate, where the first bit rate is variable; and transmitting the data stream from the streaming server to the endpoint client at a second bit rate.

Example 11 provides the method of example 10, where the endpoint client is a first endpoint client, and further including transmitting the data stream from the streaming server to a second endpoint client at the second bit rate.

Example 12 provides the method of example 10, further including changing the first bit rate based on signal bandwidth on the vehicle.

Example 13 provides the method of example 10, further including receiving, at a streaming manager, a heartbeat signal from the streaming server, where the heartbeat signal includes information on a streaming server condition and a list of streaming server streams.

Example 14 provides the method of example 10, further including displaying the sensor data in an interface at the client endpoint.

Example 15 provides the method of example 10, further including transmitting first port information to the streaming manager, and providing, by the streaming manager, the first port information and a streamer IP address to the vehicle.

Example 16 provides one or more non-transitory computer-readable media storing instructions executable to perform operations, the operations including receiving a data stream request from an endpoint client including a vehicle identification number and a view identifier; identifying a vehicle corresponding to the vehicle identification number and identifying one or more vehicle sensors corresponding to the view identifier; assigning the endpoint client to a streaming server; allocating, at the streaming server, a first port for receiving a data stream from the vehicle, where the data stream includes sensor data from the one or more vehicle sensors; allocating, at the streaming server, a second port for transmitting the data stream to the endpoint client; receiving, at the streaming server, the data stream including the sensor data from the vehicle, where the data stream is transmitted from the vehicle at a first bit rate, where the first bit rate is variable; and transmitting the sensor data from the streaming server to the endpoint client at a second bit rate.

Example 17 provides the one or more non-transitory computer-readable media of example 16, where the endpoint client is a first endpoint client, and the operations further including transmitting the data stream from the streaming server to a second endpoint client at the second bit rate.

Example 18 provides the one or more non-transitory computer-readable media of example 16, the operations further including changing the first bit rate based on signal bandwidth on the vehicle.

Example 19 provides the one or more non-transitory computer-readable media of example 16, the operations further including receiving, at a streaming manager, a heartbeat signal from the streaming server, where the heartbeat signal includes information on a streaming server condition and a list of streaming server streams.

Example 20 provides the one or more non-transitory computer-readable media of example 16, the operations further including transmitting first port information to a streaming manager, and providing, by the streaming manager, the first port information and a streamer IP address to the vehicle.

Example 21 provides a system, method, circuit, computer-readable media, and/or vehicle according to one or more of the preceding and/or following examples, wherein the data stream includes multimodal sensor data, including two or more of video data, LIDAR data, and RADAR data.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for providing data streams from a vehicle to multiple clients, comprising:

receiving a first data stream request from a first endpoint client including a vehicle identification number and a view identifier indicating a specific camera of a plurality of sensors;

identifying a vehicle corresponding to the vehicle identification number and identifying one or more vehicle sensors corresponding to the view identifier;

assigning the first endpoint client to a streaming server;

receiving a second data stream request from a second endpoint client;

determining that the second data stream request can be fulfilled by the streaming server by determining that the second data stream request specifies the same vehicle identification and the same view identifier as the data stream being received by the streaming server;

allocating, at the streaming server, a first port for receiving a data stream from the vehicle, wherein the data stream includes sensor data from the one or more vehicle sensors;

allocating, at the streaming server, a second port for transmitting the data stream to the first endpoint client;

receiving, at the streaming server, the data stream including the sensor data from the vehicle, wherein the data stream is transmitted from the vehicle at a first bit rate, wherein the first bit rate is variable; and transmitting the data stream from the streaming server to the first endpoint client at the first bit rate.

2. The method of claim 1, further comprising transmitting the data stream from the streaming server to the second endpoint client at the first bit rate.

3. The method of claim 1, further comprising changing the first bit rate based on signal bandwidth on the vehicle.

4. The method of claim 1, further comprising receiving, at a streaming manager, a heartbeat signal from the streaming server, wherein the heartbeat signal includes information on a streaming server condition and a list of streaming server streams.

5. The method of claim 1, further comprising displaying the sensor data in an interface at the first endpoint client.

6. The method of claim 1, further comprising:

transmitting first port information to a streaming manager, and providing, by the streaming manager, the first port information and a streamer IP address to the vehicle.

7. A system for providing data streams from a vehicle to multiple clients, comprising:

a vehicle including a plurality of sensors, wherein the plurality of sensors generate sensor data, and wherein the plurality of sensors include image sensors and the sensor data includes image data;

a plurality of endpoint clients including a respective plurality of client front ends; and a streaming platform including:

a streaming manager configured to:

receive a first data stream request from a first endpoint client of the plurality of endpoint clients, wherein the first data stream request includes a vehicle identification and a view identifier indicating a specific camera of the plurality of sensors, assign the first endpoint client to a streaming server, receive a second data stream request from a second endpoint client of the plurality of endpoint clients, determine that the second data stream request can be fulfilled by the streaming server by determining that the second data stream request specifies the same vehicle identification and the same view identifier as the data stream being received by the streaming server, and assign the second endpoint client to the streaming server; and the streaming server configured to:

allocate a first port for receiving a data stream from the vehicle, wherein the data stream includes the sensor data, allocate a second port for transmitting the data stream to the first endpoint client, receive the data stream including the sensor data from the vehicle, and transmit the data stream to the first endpoint client and the second endpoint client.

8. The system of claim 7, wherein the first port has corresponding first port information, and wherein the streaming server is further configured to transmit the first port information to the streaming manager, and wherein the streaming manager is further configured to provide the first port information and a streaming server IP address to the vehicle.

9. The system of claim 8, wherein the streaming server is further configured to provide a streaming server authentication certificate to the vehicle, wherein the vehicle is configured to:

validate the streaming server authentication certificate, encrypt the data stream including the sensor data, and transmit an encrypted data stream to the streaming server.

10. The system of claim 9, wherein the vehicle is further configured to transmit the encrypted data stream at a first bit rate, wherein the first bit rate is variable, and wherein the first bit rate is based on vehicle network bandwidth.

11. The system of claim 10, wherein the streaming server is further configured to transmit a request to the vehicle to adjust the first bit rate.

12. The system of claim 7, wherein the second port has corresponding second port information, and wherein the streaming server is further configured to transmit the second port information to the streaming manager, and wherein the streaming manager is further configured to provide the second port information and a streaming server IP address to the endpoint client.

13. The system of claim 7, wherein the streaming manager is further configured to determine that the second data stream request can be fulfilled by the streaming server by determining that the second data stream request can be fulfilled using the data stream.

14. The system of claim 13, wherein the streaming server is further configured to allocate a third port for transmitting the data stream to the second endpoint client, transmit the data stream to the first endpoint client via the second port, and transmit the data stream to the second endpoint client via the third port.

15. The system of claim 7, wherein the streaming manager further includes a streamer database including a list of current streamers including the streaming server, and a list of currently active streams.

16. One or more non-transitory computer-readable media storing instructions executable to perform operations, the operations comprising:

receiving a first data stream request from a first endpoint client including a vehicle identification number and a view identifier indicating a specific camera of a plurality of sensors;

identifying a vehicle corresponding to the vehicle identification number and identifying one or more vehicle sensors corresponding to the view identifier;

assigning the first endpoint client to a streaming server;

receiving a second data stream request from a second endpoint client;

determining that the second data stream request can be fulfilled by the streaming server by determining that the second data stream request specifies the same vehicle identification and the same view identifier as the data stream being received by the streaming server;

allocating, at the streaming server, a first port for receiving a data stream from the vehicle, wherein the data stream includes sensor data from the one or more vehicle sensors;

allocating, at the streaming server, a second port for transmitting the data stream to the first endpoint client;

receiving, at the streaming server, the data stream including the sensor data from the vehicle, wherein the data stream is transmitted from the vehicle at a first bit rate, wherein the first bit rate is variable; and transmitting the sensor data from the streaming server to the first endpoint client at the first bit rate.

17. The one or more non-transitory computer-readable media of claim 16, the operations further comprising transmitting the data stream from the streaming server to the second endpoint client at the first bit rate.

18. The one or more non-transitory computer-readable media of claim 16, the operations further comprising changing the first bit rate based on signal bandwidth on the vehicle.

19. The one or more non-transitory computer-readable media of claim 16, the operations further comprising receiving, at a streaming manager, a heartbeat signal from the streaming server, wherein the heartbeat signal includes information on a streaming server condition and a list of streaming server streams.

20. The one or more non-transitory computer-readable media of claim 16, the operations further comprising: transmitting first port information to a streaming manager, and providing, by the streaming manager, the first port information and a streamer IP address to the vehicle.

* * * * *